United States Patent Office 2,914,538
Patented Nov. 24, 1959

2,914,538

SOLVENT SOLUBLE PHTHALOCYANINE DYES

David I. Randall, New Vernon, Anatole Wowk, Rahway, and John Taras, Alpha, N.J., assignors to General Aniline & Film Corporation, New York, N.Y., a corporation of Delaware No Drawing. Application January 25, 1957
Serial No. 636,254

11 Claims. (Cl. 260—314.5)

This invention relates to solvent soluble phthalocyanine dyes, and relates more particularly to a novel process for the preparation of solvent soluble dyes, which upon development on the fiber yield blue dyeings having desirable fastness characteristics.

As is well known, valuable phthalocyanine compounds are obtained by treating metal phthalocyanines with oxidizing agents to produce intermediate, reversible oxidation products. These oxidation products are suitable for use in the coloring of textile materials by a process which comprises the impregnating of the textile material with a solution of the oxidation product in an organic solvent, and then treating the impregnated textile material with reducing agents or with heat to regenerate the color. Thus, the coloring of textile materials with phthalocyanine dyes is similar to the coloring of textile materials with vat dyes with the difference that vat dyes are first reduced to make them soluble, while phthalocyanine dyes are first oxidized to make them soluble. Moreover, in the case of vat dyes oxidation is resorted to to regenerate the color, while with phthalocyanine dyes a reducing operation is required to regenerate the color. It will be seen that the dyeing with phthalocyanine dyes is analogous to the dyeing with vat dyes. Accordingly, the oxidation products of the phthalocyanine dyes are known in the art as leuco phthalocyanines.

We have now discovered an improved process for the treatment of phthalocyanines whereby valuable solvent soluble dyes are obtained. In accordance with the process of our invention, one mole of a metal phthalocyanine, such as copper phthalocyanine, cobalt phthalocyanine, chromium phthalocyanine, nickel phthalocyanine and iron phthalocyanine, is reacted with from 0.75 to 1.10 moles of an oxidizing agent comprising a N-haloamide such as N-bromoacetamide, N-dibromoacetamide, N-bromopropionamide, and N-dibromopropionamide, or a N-haloimide, such as N-bromosuccinimide, trichloroisocyanuric acid, N-bromophthalimide, 1,3-dichloro-5,5-dimethylhydantoin, 1,3 - dibromo - 5,5 - dimethylhydantoin. Preferably the reaction is effected in an organic liquid which is a solvent for the oxidation products formed, i.e. the leuco metal phthalocyanines, at temperatures of from 20 to 30° C. While the reactions may be run from 2 to 24 hours, reaction durations of from 3 to 5 hours gave satisfactory results. The solvent liquids employed may be, for example, methanol, ethanol, monoethyl ether of ethylene glycol (Cellosolve), monomethyl ether of ethylene glycol (methyl Cellosolve), diethyleneglycol ethyl ether (Carbitol), benzene and chloroform. Preferably, the amount of solvent liquid employed is from 630 grams to 1400 grams per 100 grams of the phthalocyanine.

The leuco metal phthalocyanines prepared in accordance with our process do not have the characteristics reddish-blue to greenish-blue color of the parent metal phthalocyanines, but have a color ranging from yellow-green to olive to brown. To obtain the valuable blue dyes these leuco metal phthalocyanines are subjected to a color regenerating treatment such as a heat treatment, i.e. thermal regeneration, or a treatment with reducing agents, i.e. chemical regeneration. While satisfactory results may be obtained by chemically regenerating the paddings produced from leuco solutions, we prefer to develop the said paddings by the use of heat as good or better results are obtained more economically and with less operational difficulty. The thermal regeneration of the color was effected by drying the padded cloth at 80 to 100° C. in a stream of hot air. The chemical regeneration of color was achieved by action of reducing agent at about the same temperature and in an aqueous medium. Examples of reducing agents which may be employed to regenerate the color of the metal phthalocyanines are potassium ferrocyanide, sodium hydrosulfite in acid, neutral or alkaline conditions, ascorbic acid, sodium sulfide, sodium sulfhydrate, sodium thiosulfate, hydrazine hydrate, zinc formaldehyde sulfoxylate, sulfites and bisulfites of sodium or potassium and the like. The metal phthalocyanine dyes are highly satisfactory, particularly in connection with the dyeing of cellulosic textile materials, such as cotton, regenerated cellulose and the like, since they produce on such textile materials blue shades of superior light fastness and chlorine fastness.

The following examples are given for the purpose of illustrating our invention and are not to be considered in any way limitative. The parts are by weight and the temperatures are in degrees centigrade.

*Example I*

25 parts of finely divided copper phthalocyanine was slurried in 250 parts of methyl "Cellosolve." There was then added 8.5 grams of N-bromosuccinimide. The mixture was stirred at 25–30° C. for 24 hours. The unreacted pigment was filtered off and the filtrate was added to 3500 parts of water, salted out with 5% of volume of common salt. The mixture was stirred for 30 minutes and filtered. The filter cake was washed with water and dried at room temperature. This brown material when padded on cotton cloth from a solution in Carbitol and developed with hydrosulfite yielded blue dyeings.

*Example II*

50 parts of finely divided copper phthalocyanine was slurried in 500 parts of methyl "Cellosolve." There was then added 22.2 parts of trichloroisocyanuric acid

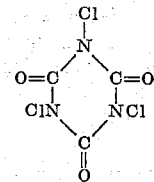

The mixture was stirred at 25–30° C. for 24 hours. The unreacted pigment was filtered off and filtrate was drowned into 7000 parts of water. During this drowning the pH=6.5 to 7.5 was maintained by addition of sodium carbonate. The mixture was stirred for 30 minutes and filtered. The filter cake was washed with water and dried at room temperature. 43 parts of leuco was obtained. It was tested by method described in Example I. Bright blue dyeings on cotton were obtained.

*Example III*

10.2 parts of N-bromoacetamide was dissolved in 112 parts of methanol and 265 parts of methyl "Cellosolve." There was then added 40.3 parts of finely divided copper phthalocyanine. The mixture was stirred at 25° C. for 4½ hours and filtered. The filter cake was washed with 94 parts of methyl "Cellosolve." The filtrate and washings were drowned into 2200 parts of water. The pH of the drowning mixture was raised to pH=8 by addition of ammonium carbonate. The mixture was stirred overnight and filtered. The filter cake was washed with water and dried at room temperature. The obtained leuco product was applied to cotton cloth in the manner described below in Example VII and yielded bright blue dyeings.

*Example IV*

7.5 parts of N-bromophthalimide was dissolved in 53 parts of methanol and 112 parts of methyl "Cellosolve." There was then added 19 parts of finely divided copper phthalocyanine. The mixture was stirred for 3 hours at 25° C. The unreacted pigment was filtered off and the filter cake was washed with 48 parts of methanol. The filtrate and washing were drowned into 2160 parts of water. The pH of the drowning mixture was raised to pH=8.5 with ammonium carbonate. The material was stirred overnight (=17 hrs.) and filtered. The filter cake was washed with 100 parts of water and dried at room temperature. The obtained product was applied to cotton fiber in the way described below in Example VII and gave bright blue dyeings of excellent light fastness, good chlorine fastness and good wash fastness.

*Example V*

21.5 parts of 1,3 - dichloro - 5,5 - dimethylhydantoin ("Halane") was dissolved in

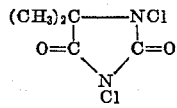

400 parts of methanol. There was then added 60 parts of copper phthalocyanine in a finely divided form. The mixture was stirred at 25° C. for 4½ hours, then filtered and the filter cake washed with 80 parts of methanol. The filtrate and washing were drowned into 6400 parts of water. The pH of drowning mixture was maintained at 5–6 by additions of ammonium carbonate. The mixture was stirred overnight (=17 hours) and filtered. The filter cake was washed with water and dried at room temperature. The product was applied to cotton fabric in the way described below in Example VII, and gave strong brilliant blue dyeings.

*Example VI*

30 parts of 1,3-dibromo-5,5-dimethylhydantoin ("Dibromantin") was dissolved in 360 parts of methanol. There was then added 57.6 of finely divided copper phthalocyanine. The mixture was stirred at 25° C. for 4½ hours and filtered. The filter cake was washed with 120 parts of methanol. By drowning filtrate and washings in water practically no precipitate of leuco compounds was obtained. The leuco has apparently only little solubility in methanol. Therefore, most of it remained in the filter cake. The filter cake was therefore washed further with methyl "Cellosolve," reslurried in methyl "Cellosolve," refiltered and washed again with methyl "Cellosolve." A total of 360 parts of methyl "Cellosolve" was thus used. The combined filtrate and two washings were drowned into 2580 parts of water. The pH of drowning mixture was increased to 8.2 with ammonium carbonate. The material was stirred overnight and filtered. The filter cake was washed with water and dried at room temperature. This material applied to cotton cloth in the manner described below in Example VII and gave strong and brilliant blue shades.

*Example VII*

0.90 part of leuco copper phthalocyanine obtained in Example I was dissolved in 62 parts of Carbitol. There were added while stirring 1 part of aminoethylethanolamine, 12.5 parts of triethanolamine, 56 parts of 0.5% Keltex Gum solution and 37 parts of 0.5% Blancol N solution. This mixture was stirred well and diluted to 250 parts with water. Mercerized cotton sheeting cloth was padded in this liquor and then dried in a steam box at 90–95° C. for 30 minutes. The dried swatches were then boiled in 0.5% soap solution for 10 minutes, rinsed and dried. Bright blue dyeings of superior fastness properties were obtained.

It is to be understood that the foregoing detailed description is given merely by way of illustration and that many variations may be made therein without departing from the spirit of our invention.

Having described our invention, what we desire to secure by Letters Patent is:

1. In a process for oxidizing a phthalocyanine to a leuco phthalocyanine, the improvement which comprises effecting the oxidation by reacting a phthalocyanine with an oxidizing agent selected from the group consisting of N-bromoacetamide, N-dibromoacetamide, N-bromopropionamide, N - dibromopropionamide, N - bromosuccinimide, trichloroisocyanuric acid, N-bromophthalimide, 1,3 - dichloro - 5,5 - dimethylhydantoin, and 1,3 - dibromo - 5,5 - dimethylhydantoin.

2. In a process for oxidizing copper phthalocyanine to its leuco form, the improvement which comprises effecting the oxidation by reacting copper phthalocyanine with an oxidizing agent selected from the group consisting of N - bromoacetamide, N - dibromoacetamide, N - brmopropionamide, N - dibromopropionamide, N - bromosuccinimide, trichloroisocyanuric acid, N-bromophthalimide, 1,3 - dichloro - 5,5 - dimethylhydantoin, and 1,3 - dibromo - 5,5 - dimethylhydantoin.

3. In a process for oxidizing copper phthalocyanine to its leuco form, the improvement which comprises effecting the oxidation by reacting copper phthalocyanine with an oxidizing agent, selected from the group consisting of N - bromoacetamide, N - dibromoacetamide, N - bromopropionamide, N - dibromopropionamide, N - bromosuccinimide, trichloroisocyanuric acid, N - bromophthalimide, 1,3 - dichloro - 5,5 - dimethylhydantoin, and 1,3 - dibromo - 5,5 - dimethylhydantoin, in a solvent for the leuco phthalocyanine compound formed selected from the group consisting of methanol, ethanol, monoethyl ether of ethylene glycol, monomethyl ether of ethylene glycol, diethylene glycol ethyl ether, benzene and chloroform.

4. Process for the preparation of blue dyeings of superior fastness to light and chlorine, which comprises forming a leuco phthalocyanine compound by reacting a metal phthalocyanine with an oxidizing agent selected from the group consisting of N-bromoacetamide, N-dibromoacetamide, N - bromopropionamide, N - dibromopropionamide, N - bromosuccinimide, trichloroisocyanuric acid, N - bromophthalimide, 1,3 - dichloro - 5,5 - dimethylhydantoin, and 1,3 - dibromo - 5,5 - dimethylhydantoin, and developing the leuco compound by subjecting the same to the action of a stream of heated air at a temperature of from 80 to 100° C.

5. Process for the preparation of blue dyeings of superior fastness to light and chlorine, which comprises forming a leuco phthalocyanine compound by reacting a metal phthalocyanine with an oxidizing agent, selected from the group consisting of N-bromoacetamide, N-dibromoacetamide, N - bromopropionamide, N - dibromopropionamide, N - bromosuccinimide, trichloroisocyanuric acid, N - bromophthalimide, 1,3 - dichloro - 5,5 - dimethylhydantoin, and 1,3 - dibromo - 5,5 - dimethylhydantoin in a solvent for the leuco metal phthalocyanine selected from the group consisting of methanol, ethanol, monoethyl ether of ethylene glycol, monomethyl ether of ethylene glycol, diethylene glycol ethyl ether, benzene and chloroform, and subjecting the leuco compound at elevated temperatures to the action of a reducing agent in a medium selected from the group consisting of aqueous, alcoholic and aqueous-alcoholic media.

6. Process for the preparation of blue dyeings of superior fastness to light and chlorine, which comprises forming a leuco phthalocyanine compound by reacting at temperatures of from 20 to 30° C. copper phthalocyanine with an oxidizing agent selected from the group consisting of N - bromoacetamide, N - dibromoacetamide, N - bromopropionamide, N - dibromopropionamide, N - bromosuccinimide, trichloroisocyanuric acid, N - bromophthalimide, 1,3 - dichloro - 5,5 - dimethylhydantoin, and 1,3 - dibromo - 5,5 - dimethylhydantoin, and developing the leuco compound at elevated temperatures.

7. Process for the preparation of blue dyeings of superior fastness to light and chlorine, which comprises forming a leuco phthalocyanine compound by reacting at temperatures of from 20 to 30° C. copper phthalocyanine with an oxidizing agent, selected from the group consisting of N - bromoacetamide, N - dibromoacetamide, N - bromopropionamide, N - dibromopropionamide, N - bromosuccinimide, trichloroisocyanuric acid, N - bromophthalimide, 1,3 - dichloro - 5,5 - dimethylhydantoin, and 1,3-dibromo-5,5-dimethylhydantoin, in a solvent for the leuco metal phthalocyanine selected from the group consisting of methanol, ethanol, monoethyl ether of ethylene glycol, monomethyl ether of ethylene glycol, diethylene glycol ethyl ether, benzene and chloroform, and subjecting the leuco compound at elevated temperatures to the action of a reducing agent in a medium selected from the group consisting of aqueous, alcoholic and aqueous-alcoholic media.

8. Process for the preparation of blue dyeings of superior fastness to light and chlorine, which comprises forming a leuco phthalocyanine compound by reacting at temperatures of from 20 to 30° C. copper phthalocyanine with an oxidizing agent selected from the group consisting of N - bromoacetamide, N - dibromoacetamide, N - bromopropionamide, N - dibromopropionamide, N - bromosuccinimide, trichloroisocyanuric acid, N - bromophthalimide, 1,3 - dichloro - 5,5 - dimethylhydantoin, and 1,3 - dibromo - 5,5 - dimethylhydantoin, and subjecting the leuco compound at elevated temperature of at most 100° C. to the action of a reducing agent.

9. Process for the preparation of blue dyeings of superior fastness to light and chlorine, which comprises forming a leuco phthalocyanine compound by reacting at temperatures of from 20 to 30° C. copper phthalocyanine with an oxidizing agent, selected from the group consist of N - bromoacetamide, N - dibromoacetamide, N - bromopropionamide, N - dibromopropionamide, N - bromosuccinimide, trichloroisocyanuric acid, N - bromophthalimide, 1,3 - dichloro - 5,5 - dimethylhydantoin, and 1,3-dibromo-5,5-dimethylhydantoin, in a solvent for the leuco copper phthalocyanine selected from the group consisting of methanol, ethanol, monoethyl ether of ethylene glycol, monomethyl ether of ethylene glycol, diethylene glycol ethyl ether, benzene and chloroform, and subjecting the leuco compound at elevated temperatures of at most 100° C. to the action as a reducing agent in a medium selected from the group consisting of aqueous, alcoholic and aqueous-alcoholic media.

10. Process for the preparation of blue dyeings of superior fastness to light and chlorine, which comprises forming a leuco phthalocyanine compound by reacting at temperatures of from 20 to 30° C. 1 mole of a copper phthalocyanine with from 0.70 to 1.10 moles of an oxidizing agent selected from the group consisting of N-bromoacetamide, N - dibromoacetamide, N - bromopropionamide, N - dibromopropionamide, N - bromosuccinimide, trichloroisocyanuric acid, N - bromophthalimide, - 1,3 - dichloro - 5,5 - dimethylhydantoin, and 1,3 - dibromo - 5,5 - dimethylhydantoin and developing the leuco compound by subjecting the same to the action of a stream of heated air at a temperature of from 80 to 100° C.

11. Process for the preparation of blue dyeings of superior fastness to light and chlorine, which comprises forming a leuco phthalocyanine compound by reacting at temperatures of from 20 to 30° C. 1 mole of a copper phthalocyanine with from 0.70 to 1.10 moles of an oxidizing agent selected from the group consisting of N-bromoacetamide, N - dibromoacetamide, N - bromopropionamide, N - dibromopropionamide, N - bromosuccinimide, trichloroisocyanuric acid, N - bromophthalimide, 1,3 - dichloro - 5,5 - dimethylhydantoin, and 1,3 - dibromo - 5,5 - dimethylhydantoin and developing the leuco compound by subjecting the same to the action of a reducing agent at a temperature of from 80 to 100° C. in a medium selected from the group of aqueous, alcoholic and aqueous-alcoholic media.

References Cited in the file of this patent

UNITED STATES PATENTS

| | | |
|---|---|---|
| 2,276,175 | Fleysher et al. | Mar. 10, 1942 |
| 2,662,895 | Pedersen | Dec. 15, 1953 |
| 2,662,896 | Pedersen | Dec. 15, 1953 |
| 2,681,347 | Pedersen | June 15, 1954 |
| 2,772,283 | Stevenson | Nov. 27, 1956 |
| 2,782,207 | Perkins et al. | Feb. 17, 1957 |

OTHER REFERENCES

Fieser and Fieser: Nat. Prod. Related to Phenanthrine. 3rd ed., p. 448, Reinhold Pub. Co., New York (1949).